(12) United States Patent
Oshima et al.

(10) Patent No.: US 7,125,129 B2
(45) Date of Patent: Oct. 24, 2006

(54) MIRROR SUPPORT MECHANISM AND OPTICAL APPARATUS USING THE SAME

(75) Inventors: Takeharu Oshima, Tokyo (JP); Noboru Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/872,556

(22) Filed: Jun. 22, 2004

(65) Prior Publication Data

US 2005/0157413 A1    Jul. 21, 2005

(30) Foreign Application Priority Data

Jan. 21, 2004    (JP) ............................... 2004-013188

(51) Int. Cl.
  *G02B 7/185*    (2006.01)
(52) U.S. Cl. ...................................... 359/849; 359/399
(58) Field of Classification Search ................ 359/846, 359/849; *G02B 7/183, 7/185*
  See application file for complete search history.

(56) References Cited

U.S. PATENT DOCUMENTS

| | | | | |
|---|---|---|---|---|
| 3,154,627 A | * | 10/1964 | Wallis | 359/848 |
| 3,427,097 A | * | 2/1969 | Kemp | 359/871 |
| 4,601,554 A | | 7/1986 | Plante et al. | 359/849 |
| 4,831,291 A | * | 5/1989 | Ames | 310/13 |
| 5,074,654 A | | 12/1991 | Alden et al. | 359/849 |
| 5,199,392 A | * | 4/1993 | Kreuter et al. | 123/90.11 |
| 5,204,784 A | * | 4/1993 | Spinhirne | 359/849 |
| 5,896,228 A | * | 4/1999 | Inoue et al. | 359/555 |
| 6,840,638 B1 | * | 1/2005 | Watson | 359/849 |

FOREIGN PATENT DOCUMENTS

| | | |
|---|---|---|
| DE | 3 521 973 | 7/1986 |
| DE | 3502024 A1 * | 7/1986 |
| DE | 4326561 A1 * | 2/1995 |

OTHER PUBLICATIONS

PTO 06-0658 "Support System for Telescope Mirror", English-language translation of DE 3521973 C1. Transl. by FLS, Inc., United States Patent and Trademark Office, Washington, D.C., Nov. 2005.*
"Chapter 5. Primary Mirror, California Extremely Large Telescope Conceptual Design for a Thirty-Meter Telescope", CELT Report No. 34, Jun. 2002, pp. 5-1 - 5-43.
J. Alan Shier, "Summary of the Celt Mirror Segment Actuator Survey", CELT Report No. 15, Feb. 20, 2001.
Kenneth R. Lorell, et al., "Design and Preliminary Test of a Precision Segment Positioning Actuator for the California Extremely Large Telescope Primary Mirror", CELT report No. 34, pp. 1-14 Future Giant Telescopes, SPIE vol. 4840, pp. 471-484, Jan. 2003.
Yasumasa Yamashita, Reflecting Telescope, Feb. 20, 1992, pp. 287-291 (with English translation of the revelant part).

* cited by examiner

*Primary Examiner*—Mark A. Robinson
(74) *Attorney, Agent, or Firm*—Oblon, Spivak, McClelland, Maier & Neustadt, P.C.

(57) ABSTRACT

A fluid pressure support mechanism has a container in which fluid pressure is applied and fluid tubes are connected to the fluid pressure support mechanisms and to a fluid pressure control unit in such a way as to make all the fluid pressure support mechanisms communicate with each other, then a fluid pressure control unit applies the fluid pressure to the containers in the respective fluid pressure support mechanisms via the fluid tubes and controls the fluid pressure, and an electrically attractive actuator translates a mirror in an axial direction with one degree of freedom for translation by attracting force produced by a driven member and an electromagnet.

6 Claims, 7 Drawing Sheets

MIRROR SUPPORT MECHANISM AND OPTICAL APPARATUS USING THE SAME

BACKGROUND OF THE INVENTION

1. Field of the Invention

The present invention relates to a mirror support mechanism that supports a mirror integrated in a telescope in such a way as to prevent a mirror surface accuracy from being degraded by the deformation of the mirror, and an optical apparatus using the same.

2. Description of the Related Art

A mirror support mechanism in a conventional telescope is described in a non-patent document 1. According to FIG. 4. 24 (page 290) and description corresponding to the drawing in this non-patent document 1, a whiffle-tree support mechanism is disclosed as a support in the axial direction of a main mirror. In this whiffle-tree support mechanism, spherical seats are provided at three fixed points and a trifurcate pole is placed on each of these spherical seats and nine pads of the main mirror are placed on the top of the trifurcate pole via spherical seats. The trifurcate pole is made freely incline along the back of the main mirror by the spherical seats provided at the fixed points, whereby the nine pads of the main mirror are arrayed in the same plane. By this arrangement of support mechanism it is prevented that the harmful deformation due to the internal stress of the support mechanism for the main mirror is transmitted to the main mirror.

[Non-patent document 1] Reflecting Telescope, by Yasumasa Yamashita, 4.2.1 Position Control and Force Control of Mirror, p287–p291, published by University of Tokyo Press, 1992.

In optical telescopes or radio telescopes for making astronomic observation or the like in recent years, there has been a tendency to increase its size of main mirrors for the purpose of improving a resolving power and making more accurate observation. In a large size telescope like this, the main mirror is made of one mirror panel or a plurality of mirror panels, and in the case of constructing the telescope with one main mirror, a technology has been employed in which the main mirror is actively driven to make the mirror surface is adjusted in order to correct the deformation of main mirror caused by temperature distribution or inclination by gravity. And in the case where the main mirror is made of a plurality of mirror panels to form one main mirror as a whole, in order to adjust the position in the direction of a mirror axis and the inclination of each mirror panel, a technology for actively driving the mirror panels has been employed. According to the conventional mirror support mechanism disclosed in the non-patent document 1, a technology of using a plurality of mechanical parts such as spherical seats in a passive support structure, is disclosed. However, if an active driving mechanism is added to this passive structure and the main mirror or the individual mirror panels are intended to drive, there is presented a problem that the bandwidth of drive control cannot be maintained in wide area because of backlash in the mechanical parts in the support structure and the low rigidity of the support structure. In addition, there is also presented a problem that as the main mirror is increased in size and the number of mirror panels are increased, number of parts are drastically increased to make its cost expensive in the conventional support structure and at the same time, an increased number of parts makes the structure complicated and accuracy degraded in manufacturing and assembling.

SUMMARY OF THE INVENTION

The present invention has been made to solve the above described problems. It is the object of the invention to provide a mirror support mechanism capable of preventing a mirror surface accuracy from being degraded caused by the deformation of a mirror and expanding the bandwidth of drive control in an active drive system, and an optical apparatus using the same.

A mirror support mechanism in accordance with the present invention includes: a mirror cell provided at the back of a mirror; a fluid pressure support mechanism that is provided between the mirror cell and the mirror and applies support pressure to the mirror by a container having its volume changed by fluid pressure; an electromagnetic attracting type actuator having, a rod connected to the mirror, a driven member mounted on the rod and driven by electromagnetic force, an electromagnet provided opposite to the driven member, and a container provided between the rod and the mirror cell and having its volume changed by the fluid pressure; and a fluid pressure control unit that controls the fluid pressure applied to the container in the fluid pressure support mechanism and the fluid pressure applied to the container in the electromagnetic attracting type actuator.

And, an optical apparatus in accordance with the present invention includes: a plurality of segment mirrors; a mirror cell provided at the backs of the plurality of segment mirrors; fluid pressure support mechanisms each of which is provided between the mirror cell and the segment mirror and applies support pressure to the segment mirror by a container having its volume changed by fluid pressure; an electromagnetic attracting type actuator having, a rod connected to the segment mirror, a driven member mounted on the rod and driven by electromagnetic force, an electromagnet provided opposite to the driven member, and a container provided between the rod and the mirror cell and having its volume changed by the fluid pressure; and a fluid pressure control unit that controls the fluid pressure applied to the container in the fluid pressure support mechanism and the fluid pressure applied to the container in the electromagnetic attracting type actuator.

Therefore, according to the present invention, the mirror is supported by the fluid pressure support mechanism and the electromagnetic attracting actuator. Hence, it is possible to increase the rigidity of the support mechanism and to expand the bandwidth of position control.

Further, according to the present invention, fluid tubes are connected to the containers of the fluid pressure support mechanisms so as to make all the fluid pressure support mechanisms communicate with each other. Therefore, it is possible to shorten the length of the fluid tubes and hence to reduce cost, and since the connection points of the fluid tubes are reduced in total number, it is possible to reduce connection errors and hence to improve ease of assembling and maintainability.

Still further, according to another aspect of the present invention, the container having its volume changed by the fluid pressure is not provided in the electromagnetic attracting actuator. Therefore, it is possible to reduce the number of constituent parts and hence to reduce cost.

Still further, according to other aspect of the present invention, pressurization applied in the electromagnetic attracting actuator is applied by an elastic member. Therefore, it is possible to simplify its structure and hence to reduce the number of parts.

Still further, according to still other aspect of the present invention, electromagnets are provided above and below the driven member in the electromagnetic attracting actuator to move up and down the driven member to drive the electromagnetic attracting actuator against external disturbances. Therefore, it is possible to reduce amount of the heat generated in the electromagnetic attracting actuator.

DETAILED DESCRIPTION OF THE PREFERRED EMBODIMENTS

Embodiment 1

Figure 1:
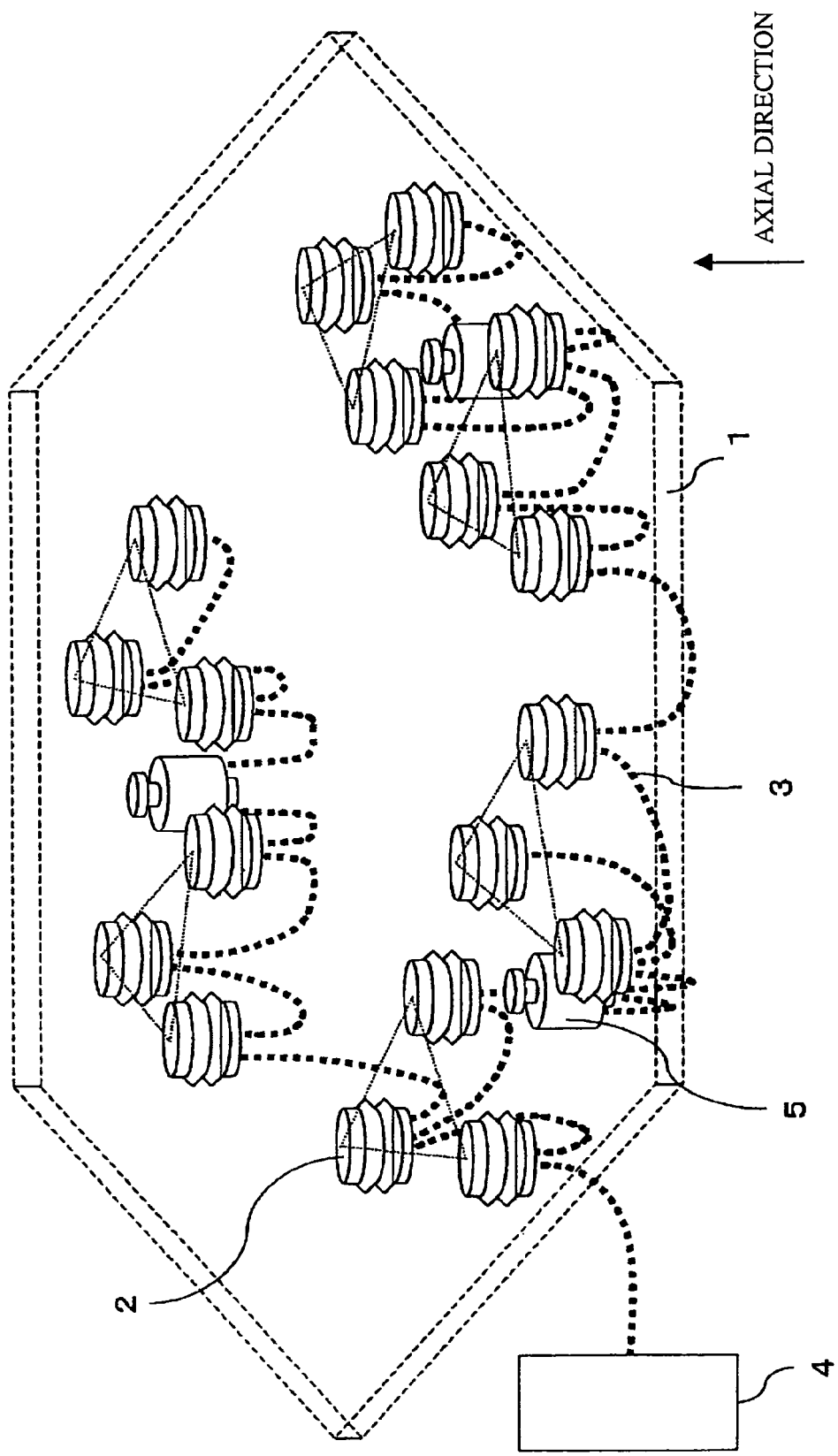
FIG. 1 is a perspective view to show the structure of a mirror support mechanism in accordance with embodiment 1 of the present invention.
Figure 2:
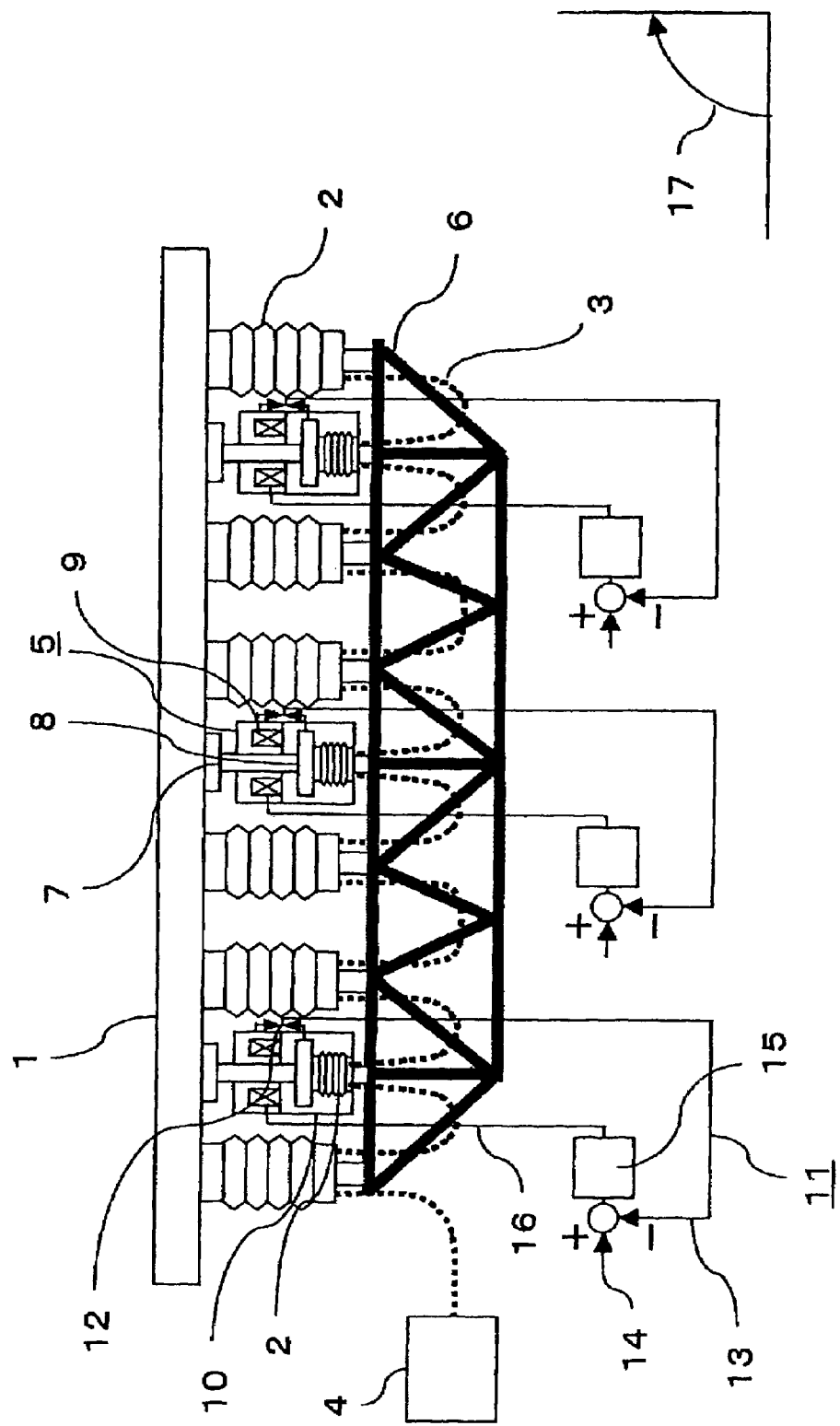
FIG. 2 is a structure diagram of the mirror support mechanism in accordance with embodiment 1 of the present invention.

A mirror support mechanism in accordance with embodiment 1 of the present invention will be described on the basis of FIG. 1 and FIG. 2. FIG. 1 is a perspective view to show the structure of a mirror support mechanism in accordance with embodiment 1 of the present invention. FIG. 2 is a structure diagram of the mirror support mechanism in accordance with embodiment 1 of the present invention. In FIG. 1 is shown a mirror support mechanism provided with an actuator for supporting a single mirror in an axial direction and displacing the mirror as a rigid body. In FIG. 1, a reference numeral 1 denotes a mirror. Although the mirror is shown as a hexagonal mirror in the drawing, the mirror may be a mirror of any type such as circular mirror, square mirror, plane mirror, or curved mirror. A reference numeral 2 denotes a fluid pressure support mechanism for supporting the mirror 1 in the axial direction and the fluid pressure support mechanism 2 is connected to the mirror 1 at mounting surfaces made in the mirror 1 so as to support the bottom surface of the mirror 1 or a neutral surface in a direction of thickness of the mirror 1. The fluid pressure support mechanism 2 has a container in which fluid pressure is applied. This container is made to expand or contract by the fluid pressure to change its volume and, for example, is a container having a bellows on the side or a container made of a piston and a cylinder. In FIG. 1, the fluid pressure support mechanisms 2 are provided at 18 positions so as to reduce the deformation of mirror 1 caused between the fluid pressure support mechanisms 2 by its self weight of the mirror 1. As will be described later, one fluid pressure support mechanism is provided in each of electromagnetic attracting type actuators 5 mounted at three positions, so fluid pressure support points total up to 21. The number of fluid pressure support mechanisms 2 varies according to value of allowable deformation between support points caused by self weight and three or more fluid pressure support mechanisms 2 including the fluid pressure support mechanisms in the electromagnetic attracting type actuators 5 may be sufficient. The area of an interface surface (an effective face where pressure is applied to the mirror 1 in the axial direction in the fluid pressure support mechanism 2, it is used for the same meaning in the following description) between the fluid pressure support mechanism 2 and the mirror 1 is set in such a way that a value obtained by dividing mirror weight which is shared and supported by each fluid pressure support mechanism 2, by the area is equal to each other. In other words, the area of interface surface is set in such a way that support pressures of all fluid pressure support mechanisms 12 are equal to each other. A reference numeral 3 denotes fluid tubes which is provided so as to make the fluid pressure support mechanisms 2 and to communicate with each other, and the fluid tubes 3 are connected to the containers in the fluid pressure support mechanisms 2 (including the fluid pressure support mechanisms in the electromagnetic attracting type actuators 5). A reference numeral 4 denotes a fluid pressure control unit connected to the fluid tube 3 and adjusting the support pressures of all fluid pressure support mechanisms 2 at a desired value and this fluid pressure control unit 4 applies a desired fluid pressure to the containers in the fluid pressure support mechanisms 2 (including the fluid pressure support mechanisms in the electromagnetic attracting type actuators 5). At this point, while the fluid tubes 3 are connected to the fluid pressure support mechanisms 2 so that all fluid pressure support mechanisms 2 are made to communicate with each other, the connection method is sufficient by which as far as the support pressures of all fluid pressure support mechanisms 2 are made equal to each other and, for example, a distribution pipe may be provided in the path of fluid tubes 3. A reference numeral 5 denotes the electromagnetic attracting type actuator having 1 degree of freedom for translation in the axial direction that displaces the mirror 1 as a rigid body. A method for connecting this electromagnetic attracting type actuator 5 to the mirror 1 is the same as the method for connecting the fluid pressure support mechanisms 2 to the mirror 1. The use of three electromagnetic attracting type actuators 5 like this structure can provide the mirror 1 with 1 degree of freedom for translation and 2 degrees of freedom for rotation. In the structure of a mirror support mechanism shown in FIG. 1, a support mechanism for supporting the mirror 1 only in the axial direction is shown, but another support mechanism may be provided to support the mirror 1 to be displaced in a lateral direction. As for fluid to be used, gas such as air or liquid such as water may be used. Here, the axial direction of mirror 1 denotes the direction of mirror axis of mirror 1 and the lateral direction denotes two directions which are orthogonal to the axial direction.

Next, the inner structure and the like of the electromagnetic attracting type actuator 5 used in the mirror support mechanism will be described on the basis of FIG. 2. In FIG. 2, the number of fluid pressure support mechanisms 2 is different from the number of those in FIG. 1, but this is due to simplified depiction. In FIG. 2, a reference numeral 6 denotes a mirror cell made of a truss as a base for supporting the mirror 1 and the mirror cell 6 is connected to the bottoms of the fluid pressure support mechanisms 2 and the electromagnetic attracting type actuators 5. A material having a high rigidity and a low thermal expansion coefficient such as iron, invar alloy, CFRP (Carbon Fiber Reinforced Plastic) and the like are usually used as the material of this mirror cell 6. As for a general structure, the mirror 1 and the mirror cell 6 are connected to each other in the axial direction via the fluid pressure support mechanisms 2 and the electromagnetic attracting type actuators 5. As for the inner structure of the electromagnetic attracting type actuators 5, a reference numeral 7 denotes a rod which is mounted on the mounting surface of mirror 1 in the axial direction (at a lower position in vertical direction), and 8 denotes a driven member which is mounted on the bottom of rod 7 and a disk shaped steel plate is used as the driven member 8 in FIG. 2. A reference numeral 9 denotes an electromagnet having a hole in the center through which the rod 8 can pass. At this point, the diameter of the disk shaped steel plate shown as the driven member 8 in FIG. 2 and the diameter of the electromagnet 9 may be as much as large enough for these constituent parts to be attracted by electromagnetic force and the outside diameter of steel plate is generally made not smaller than the inside diameter of electromagnet 9. Here, the shape of driven member 8 is not limited to the shape of disk and a magnetic material such as iron and the like may be acceptable as the material of the driven member 8. The fluid pressure support mechanism 2 is connected, coaxially with the rod 7, to the bottom of driven member 8. This fluid pressure support mechanism 2 in the electromagnetic attracting type actuator 5 also has a container in which fluid pressure is applied as is the case with the fluid pressure support mechanism 2 provided outside the electromagnetic attracting type actuator 5. This container is expanded or contracted by the fluid pressure to change its volume and, for example, is a container having a bellows on the side or a container made with a piston and a cylinder. A reference numeral 10 denotes a casing made of plastic or metal to which the electromagnet 9 is fixed. The bottom surface of the fluid pressure support mechanism 2 in the electromagnetic attracting type actuator 5 is also fixed to this casing 10. The casing 10 is mounted on the mirror cell 6 via an interface member. As for a control circuit to control this electromagnetic attracting type actuator 5, a reference numeral 11 denotes a closed-loop position control circuit which controls a gap between the driven member 8 and the electromagnet 9, and 12 denotes a non-contact gap sensor such as inch worm capacitive sensor or the like provided between the driven member 8 and a fixed side which are the casing 10 and the electromagnet 9, and 13 denotes a gap signal line for transmitting a gap signal output from the gap sensor 12, and 14 denotes a gap control command line for transmitting a gap control command for controlling the gap at a desired value. At this point, the gap signal line 13 and the gap control command line 14 are connected so as to calculate a fimite difference as shown in FIG. 2. Next, a reference numeral 15 denotes a drive circuit that converts the amount of drive to control the gap at a desired value to the value of current to be passed through the electromagnet 9, and 16 denotes a current signal line for passing the current, which is an output from the drive circuit 15, through the electromagnet 9 and provided so as to connect the drive circuit 15 to the electromagnet 9.

Next, the operation of mirror support mechanism will be described on the basis of FIG. 1 and FIG. 2. First, in order to support the self weight of mirror 1, the fluid pressure support mechanisms 2 are operated. In general, in an optical apparatus such as telescope or the like, an elevation angle 17 is changed. According to this change in position, the self weight applied to the fluid pressure support mechanisms 2 is changed nearly in relation to a sine component of the elevation angle 17. In the case where a change in the elevation angle 17 is sensed by some angle sensor, pressure in the axial direction required to support the mirror 1 in the fluid pressure control unit 4 can be calculated. The fluid pressure control unit 4 adjusts the amount of supply and the amount of discharge of fluid to control the support pressure of the fluid pressure support mechanisms 2 connected to the fluid pressure control unit 4 via the fluid tube 3, at the calculated value. Here, all the fluid pressure support mechanisms 2 are made to communicate with each other by the fluid tubes 3, so the same support pressure is always applied to the mirror 1 and hence the mirror 1 is supported by pressure as it were placed in a gravity-free state.

Next, a method for controlling the rigid-body position of mirror 1 will be described. The rigid-body position of mirror 1 is typified by a gap between the driven member 8 and the fixed side including the electromagnet 9 and the casing 10. For example, in the case of translating the mirror 1 by a desired value (a) in the axial direction, the closed-loop position control circuit 11 is controlled so that the gap of each of the electromagnetic attracting type actuators 5 mounted at three positions becomes (present value+(a)). That is, in the case where a difference between a gap signal from the gap sensor 12 and the desired gap (=present value+(a)) is not zero, a current command value is transmitted from the drive circuit 15 to the electromagnet 9 via the current signal line 16 to pass a current through the electromagnet 9, whereby an electromagnetic force is generated to attract the driven member 8 in order to adjust the gap. Since the mirror 1 is connected to the driven member 8 via the rod 7, this action controls the mirror 1 so that the position of mirror 1 is displaced by (a) in the axial direction. Moreover, also even in the case where passing of the current through the electromagnet 9 in electromagnetic attracting type actuator 5 is stopped, the fluid pressure control unit 4 controls the support pressure applied to the fluid pressure support mechanisms 2 at a constant value and hence the mirror 1 is held at a desired position. At this point, the weight of the mirror 1 and the weight of the driven member 8 which are shared by the electromagnetic attracting type actuator 5, are supported by the fluid pressure support mechanisms 2 that are provided coaxially with the rod 7 under the driven member 8, which can prevent the mirror surface from being deformed by its self weight near the electromagnetic attracting type actuator 5 and can require the electromagnet 9 to generate only attracting force need purely to control the gap.

At this point, in the case when the deformation of mirror 1 caused by its self weight at the position where the electromagnetic attracting type actuator 5 is arranged, does not become a problem, it is also possible that the fluid pressure control unit 4 fluid pressureally controls the mirror 1 at a desired position by the fluid pressure support mechanisms 2 other than the fluid pressure support mechanisms 2 provided in the electromagnetic attracting type actuators 5, and that the fluid pressure support mechanisms 2 provided in the electromagnetic attracting type actuators 5 apply pressurization to the electromagnetic attracting type actuators 5, respectively.

As described above, since the mirror support mechanism in the axial direction is made of a combination of the fluid pressure support mechanisms 2 and the electromagnetic attracting type actuators 5, it is possible to greatly expand the bandwidth of closed-loop position control circuit 11 because the whole support mechanism has a higher rigidity and less mechanical backlash as compared with the support mechanism of whiffle-tree structure which has been used conventionally in the related art. Further, this structure reduces the number of parts and hence can also reduce cost and can enhance ease of manufacturing. Still further, since the fluid pressure support mechanism 2 (which is provided in the electromagnetic attracting type actuator 5) connected to the fluid pressure support mechanism 2 for supporting the mirror 1 is provided coaxially with the rod 7 under the driven member 8, it is possible to prevent the local deformation of mirror surface generated when the electromagnetic attracting type actuator 5 is driven.

Here, it is possible to control the fluid pressure control unit 4 in such a way that a fluid pressure is increased in the electromagnetic attracting type actuator 5 when a current applied to pass through the electromagnet 9 is more than a predetermined value. This control can eliminate the need for providing a sensor for controlling the fluid pressure. Moreover, this control can be performed in the same way in the following embodiments 2 to embodiment 6.

Embodiment 2

Figure 3:
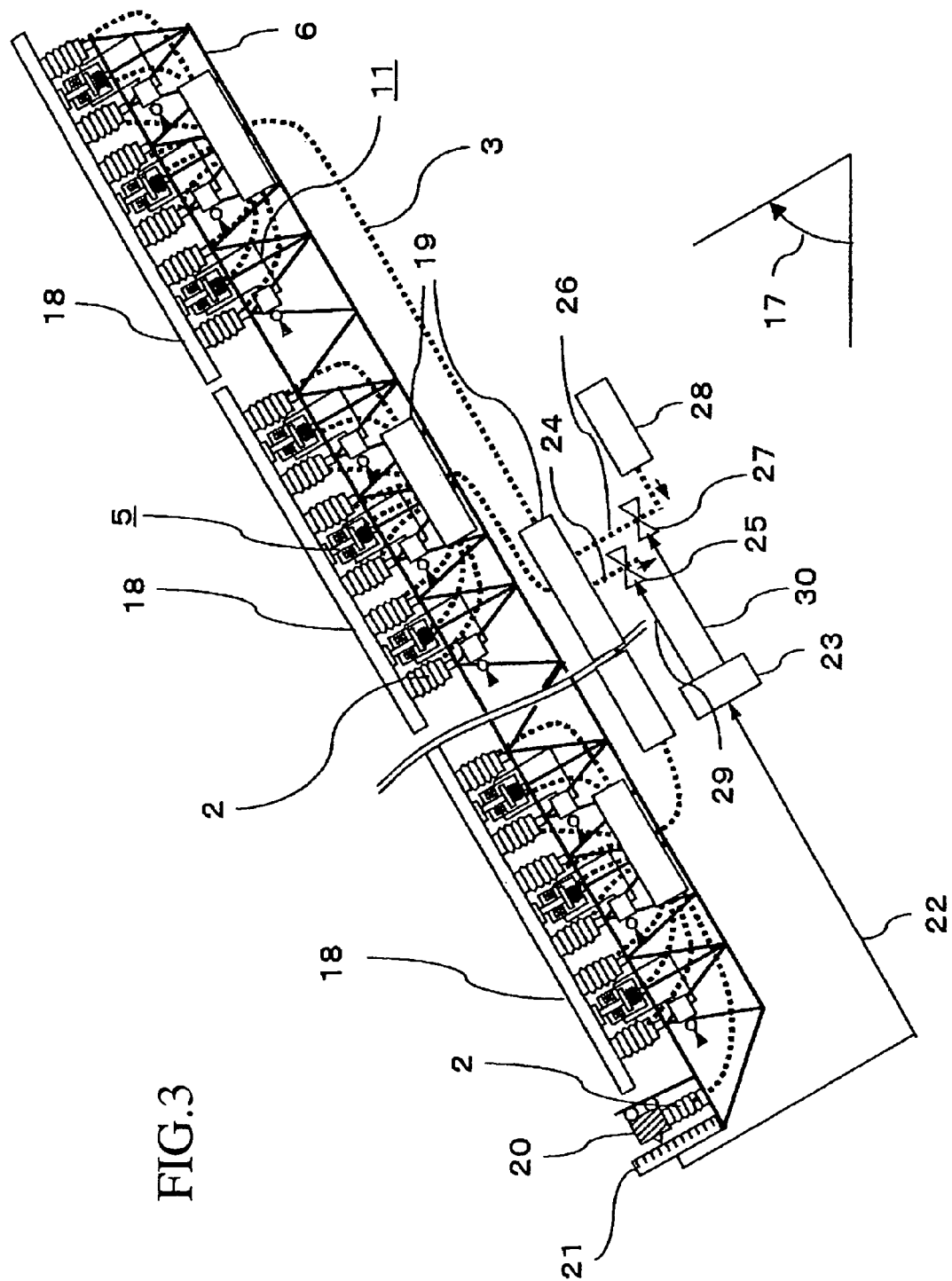
FIG. 3 is a structure diagram of a mirror support mechanism and an optical apparatus using the same in accordance with embodiment 2 of the present invention.

FIG. 3 is a structure diagram of a mirror support mechanism and an optical apparatus using the same in accordance with embodiment 2 of the present invention. In FIG. 3, a reference numeral 18 denotes a segment mirror in which a plurality of small size mirrors 1 are spread so as to produce a predetermined gap, thereby composing a mirror as if it were made of a single mirror, and a plurality of segment mirrors 18 are arranged to form an optical apparatus. Of course, the segment mirror 18 may be made of a single mirror in some cases. For example, as in the concept of a terrestrial telescope having a large caliber typified by CELT (California Extremely Large Telescope) and OWL (Overwhelmingly Large Telescope), there are cases where one thousand or more hexagonal segment mirrors 18 each having a diameter of about 1 m are spread. The segment mirror 18 is supported by the mirror cell 6 via the fluid pressure support mechanisms 2 and the electromagnetic attracting type actuators 5 in the same manner as described in embodiment 1. Next, a control mechanism of fluid pressure, will be described. A reference numeral 19 denotes a distribution pipe and the distribution pipe 19 is made of a first stage distribution pipe 19 connected to the respective fluid pressure support mechanisms 2 for supporting one segment mirror 18 via the fluid tubes 3 and a second stage distribution pipe 19 for integrating a plurality of first stage distribution pipes 19 via the fluid tubes 13. At this point, any number of fluid pressure support mechanisms 2 may be connected to the first stage distribution pipe 19. Moreover, the fluid pressure support mechanisms 2 attached to a mirror assembly called a cluster which is an integration of a plurality of segment mirrors 18, may be connected to the first stage distribution pipe 19, or all the respective fluid pressure support mechanisms 2 of all the segment mirrors 18 composing the whole optical apparatus, can be connected as one group to the first stage distribution pipe 19. In this manner, various structures can be thought for the connecting relation for the distribution pipes 19, the fluid tubes 3 and the fluid pressure support mechanisms 2, and any structure can be accepted as far as which can transmit the fluid pressure controlled by a fluid pressure control unit 23, which will be described later, to the fluid pressure support mechanisms 2 via the distribution pipes 19 and the fluid tubes 3. A reference numeral 20 denotes a weight made of metal or the like, and bottom of the weight 20 is fixed to the mirror cell 6 via the fluid pressure support mechanism 2. This fluid pressure support mechanism 2 is connected to the distribution pipe 19 such that its support pressure becomes equal to the support pressure of fluid pressure support mechanism 2 supporting the other segment mirror 18. Moreover, the weight of weight 20 and the area of interface surface of the fluid pressure support mechanism 2 which is connected to the bottom of weight 20 are adjusted such that the support pressure becomes equal to the support pressure of other fluid pressure support mechanism 2. A reference numeral 21 denotes a scale which is adjacent to the weight 20 and supported by the mirror cell 6, and a position of the weight 20 in the axial direction can be read by the scale 21. A reference numeral 22 denotes a position information signal line of the weight 20 read by the scale 21; 23 denotes a fluid pressure control unit connected to the scale 21 via the position information signal line 22; 24 denotes a fluid delivery pipe connected to the distribution pipe 19; 25 denotes a fluid delivery valve provided in the path of fluid delivery pipe 24; 26 denotes a fluid supply pipe connected to the distribution pipe 19; 27 denotes a fluid supply valve in the path of fluid supply pipe 26; 28 denotes a compressor connected to the distribution pipe 19 via the fluid supply pipe 26; 29 denotes a fluid delivery control signal line for transmitting the operation control signal of the fluid delivery valve 25 from the fluid pressure control unit 23 to the fluid delivery valve 25; and 30 denotes a fluid supply control signal line for transmitting the operation control signal of the fluid supply valve 27 from the fluid pressure control unit 23 to the fluid supply valve 27.

Next, the operation of the mirror support mechanism and the optical apparatus using the same will be described with reference to FIG. 3. In the optical apparatus made of the segment mirrors 18 and the like, an elevation angle is changed. In this case, as described also in embodiment 1, the support pressure of fluid pressure support mechanism 2, that is, the sine component of self weight of the segment mirror 18 is also changed. In embodiment 2, in order to keep the position in the axial direction of the segment mirror 18 with respect to the mirror cell 6 at a predetermined position, a mechanism for controlling the support pressure is provided. For example, when the elevation angle 17 is 90 degrees, that is, the segment mirror 18 faces to the zenith, the fluid delivery valve 25 is closed and the fluid supply valve 27 is opened and the compressor 28 is started to apply the support pressure to all the fluid pressure support mechanisms 2 to move up all the segment mirrors 18 to desired positions and then the fluid supply valve 27 are completely closed as well as the fluid delivery valve 25. With this operation, the positions of segment mirrors 18 are set at a position shown on the scale 21 of weight 20 (state where a reference position is set) and this position on the scale 21 is stored as a reference value in the fluid pressure control unit 23. Next, when the elevation angle 17 is changed, the sine component of self weight of the segment mirror 18 is decreased and hence the support pressure becomes excessive in the state where the fluid delivery valve 25 and the fluid supply valve 27 are completely closed, hence, the segment mirror 18 is translated upward in the axial direction. At this time, a position signal output from the scale 21 is changed to cause a difference between the position signal and the reference value stored in the fluid pressure control unit 23. The fluid delivery valve 25 or the fluid supply valve 27 is opened or closed in such a way as to cancel this difference in order to adjust the support pressure, whereby the position in the axial direction of the segment mirror 18 can be held at the reference value irrespective of a change in the elevation angle 17.

As for the rigid-body position control of the segment mirror 18 by use of the electromagnetic attracting type actuators 5, the same technology as described in embodiment 1 can be used. That is, the respective electromagnetic attracting type actuators 5 are controlled by the closed-loop position control units 11 which are provided in the respective electromagnetic attracting type actuators 5 in order to control heights in the axial direction at the support points where the segment mirrors 18 are respectively supported by the electromagnetic attracting type actuators 5. In the optical apparatus made of the segment mirrors 18 and the like, in particular, they are important that control of heights of mirror surfaces and control of a difference in height in the axial direction between the respective segment mirrors 18, which are caused by the plurality of segment mirrors 18. For example, the following system can be thought: the wave front shape of mirror surface formed by the whole segment mirrors 18 is sensed by various wave front measurement technologies to find out the positions and the amounts of deviation of the segment mirrors 18 deviated from an ideal mirror surface (designed mirror surface); and the electromagnetic attracting type actuators 5 are controlled on the basis of these positions and the amounts of deviation. Moreover, in the case where the fluid pressure support mechanism 2 in the electromagnetic attracting type actuator 5 is used so as to apply a pressurization to the electromagnetic attracting type actuator 5, operation can be performed in the same manner as in embodiment 1.

As described above, in the optical apparatus made of the segment mirrors 18, the mirror support mechanism in the axial direction is made of a combination of the fluid pressure support mechanisms 2 and the electromagnetic attracting type actuators 5. Therefore, it is possible to perform the position control of the mirror surface in a wide bandwidth and to reduce cost, and further it is possible to hold the segment mirrors 18 at predetermined positions even in the case where the power of electromagnetic attracting type actuators 5 is turned off.

Embodiment 3

Figure 4:
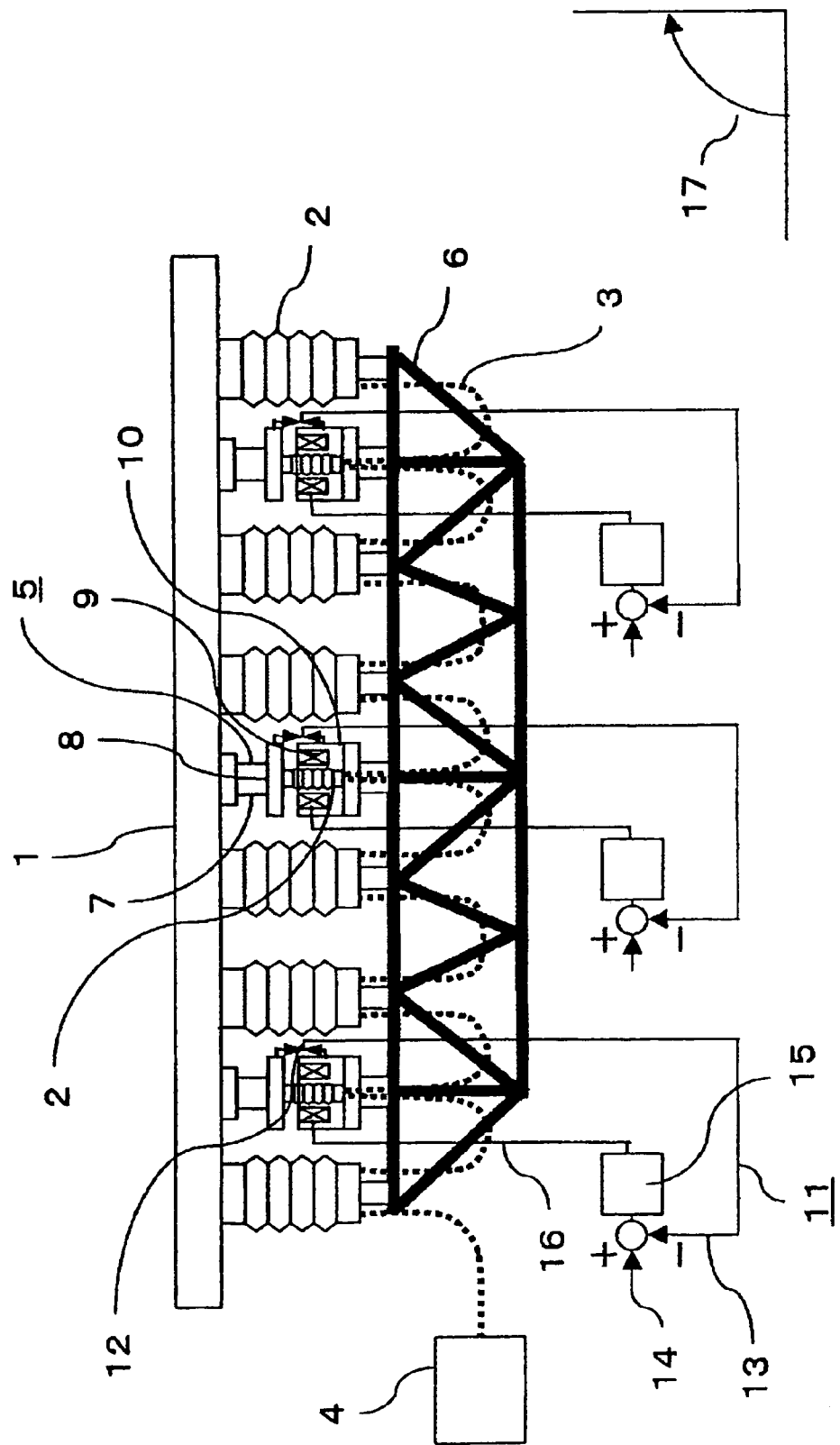
FIG. 4 is a structure diagram of a mirror support mechanism in accordance with embodiment 3 of the present invention.

In the electromagnetic attracting type actuator 5 described in embodiment 1, the driven member 8 can be provided outside the casing 10. FIG. 4 is a structure diagram of a mirror support mechanism in accordance with embodiment 3 of the present invention. In embodiment 1, the driven member 8 is arranged opposite to the bottom surface of the electromagnet 9 in the casing 10 of electromagnetic attracting type actuator 5, but in embodiment 3, the driven member 8 is arranged at a position opposite to the top surface of electromagnet 9. The rod 7 which is connected to the mirror 1 is provided with the driven member 8 and the electromagnet 9 is arranged opposite to and below the driven member 8. The electromagnet 8 is held by the casing 10 and the casing 10 is fixed to the mirror cell 6. The gap sensor 12 is provided between the driven member 8 and the fixed side which are the casing 10 and the electromagnet 9. Further, the driven member 8 is passed through the center of electromagnet 9 in order to be supported by the fluid pressure support mechanism 2 which is connected to the bottom surface of casing 10. Here, in FIG. 4, parts denoted by the same reference symbols as in FIG. 1 are parts equivalent to or corresponding to those in FIG. 1.

The mirror support mechanism shown in FIG. 4 is operated in the same way as the mirror support mechanism described with reference to FIG. 1 in embodiment 1 and hence its further description will be omitted here. Since the mirror support mechanism is structured in the manner described above, the gap between the driven member 8 and the electromagnet 9 can be directly observed, so it is possible to easily find a breakdown in the electromagnetic attracting type actuators 5 and hence to improve maintainability.

Embodiment 4

Figure 5:
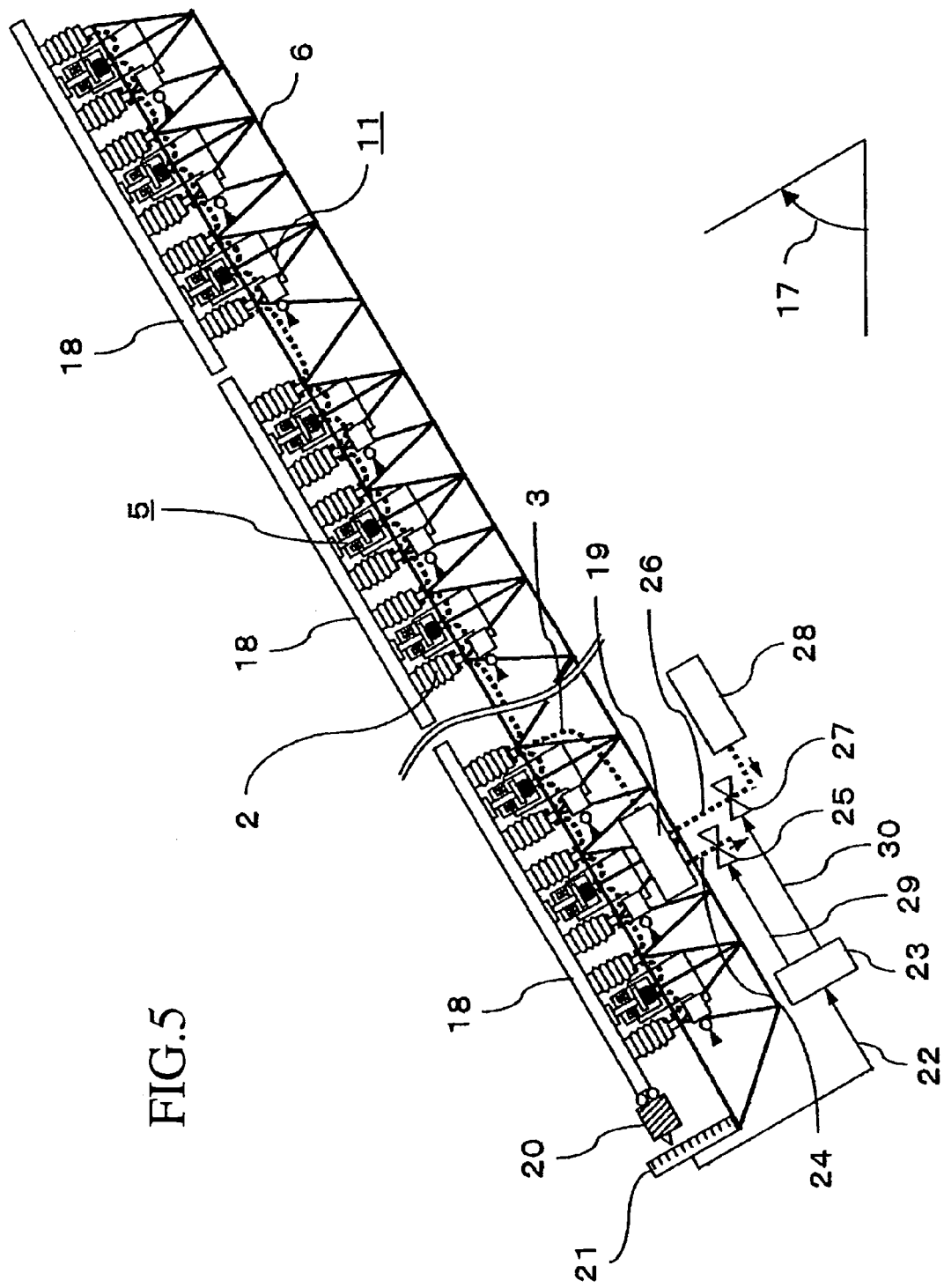
FIG. 5 is a structure diagram of a mirror support mechanism and an optical apparatus using the same in accordance with embodiment 4 of the present invention.

FIG. 5 is a structure diagram of a mirror support mechanism and an optical apparatus using the same in accordance with embodiment 4 of the present invention. In the method for connecting the fluid tubes 3 to the fluid pressure support mechanisms 2, which is shown in embodiment 2, the distribution pipe 19 is provided for each segment mirror 18 and the fluid tubes 3 are connected to the respective fluid pressure support mechanisms 2 mounted on the segment mirror 18 from this distribution pipe 19. In embodiment 4, as shown in FIG. 5, the fluid tubes 3 are connected to the fluid pressure support mechanisms 2 so that all the fluid pressure support mechanisms 2 communicate with each other and the distribution pipe 19 is connected to one fluid path formed of these fluid pressure support mechanisms 2 and fluid tubes 3 by one fluid tube 3.

In embodiment 4, the respective adjacent fluid pressure support mechanisms 2 are connected to each other, so a total length of fluid tubes 3 can be made short. Needless to say, a combination of embodiment 2 and embodiment 4 is also possible. For example, the following structure can be thought: the fluid tubes 3 are connected in such a way as to make a plurality of fluid pressure support mechanisms 2 for supporting one segment mirror 18 communicate with each other to form a fluid path for each segment mirror 18; and one distribution pipe 19 is connected to the respective fluid paths by the fluid tubes 3.

The structure described above can reduce the lengths of the fluid tubes 3 and hence can reduce cost. Furthermore, the connection points of the fluid tubes 3 can be reduced in total to reduce connection errors, there by improving ease of assembling and maintain ability.

Embodiment 5

Figure 6:
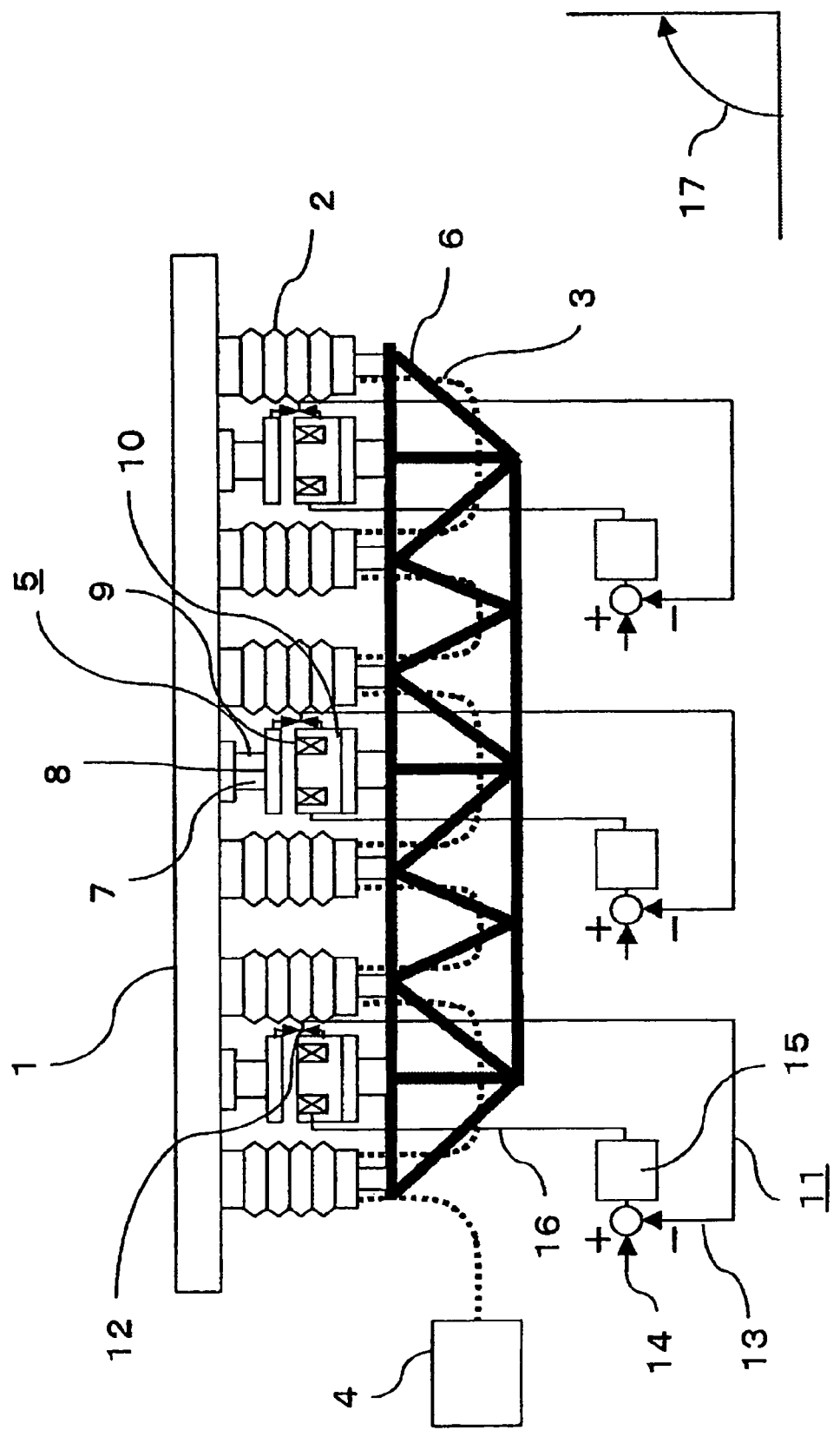
FIG. 6 is a structure diagram of a mirror support mechanism in accordance with embodiment 5 of the present invention.

While the fluid pressure support mechanism 2 is provided in the electromagnetic attracting type actuator 5 described in embodiment 1 to embodiment 4, however, embodiment 5 employs a structure in which the fluid pressure support mechanism 2 is not provided in the electromagnetic attracting type actuator 5. FIG. 6 is a structure diagram of a mirror support mechanism in accordance with embodiment 5 of the present invention. In FIG. 6, the electromagnetic attracting type actuator 5 is made of the rod 7 connected to the mirror 1, the driven member 8 mounted on this rod 7, the electromagnet 9 provided opposite to the driven member 8, and the casing 10 holding the electromagnet 9 and fixed to the mirror cell 6, and hence is not provided with the fluid pressure support mechanism 2. At this point, in FIG. 6, parts denoted by the same reference symbols as in FIG. 2 show parts equivalent to or corresponding to parts in FIG. 2.

In the structure of mirror support mechanism in accordance with this embodiment 5, different from embodiment 1 to embodiment 4, it is impossible to prevent local deformation caused by the self weight of mirror 1 near the electromagnetic attracting type actuator 5 by the fluid pressure support mechanism 2 provided in the electromagnetic attracting type actuator 5. However, if the amount of deformation caused by the self weight near the electromagnetic attracting type actuator 5 is reduced less than an allowance by narrowing the arrangement intervals of the fluid pressure support mechanisms 2 near the electromagnetic attracting type actuator 5, the mirror support mechanism can have a structure in which the fluid pressure support mechanism 2 is not required to be provided in the electromagnetic attracting type actuator 5. Here, the mirror support mechanism shown in FIG. 6 is operated in the same way as the mirror support mechanism described in embodiment 1 to embodiment 4 and hence its further description will be omitted. However, since the electromagnetic attracting type actuator 5 does not have the fluid pressure support mechanisms 2 provided therein, the position in the axial direction of the mirror 1 near the electromagnetic attracting type actuator 5 is adjusted by an electromagnetic force generated between the electromagnet 9 and the driven member 8.

Since the mirror support mechanism is structured in the manner described above, it is possible to directly observe the gap between the driven member 8 and the electromagnet 9 and hence to easily find a breakdown in the electromagnetic attracting type actuator 5 and hence to improve maintain ability. Further, since the fluid pressure support mechanism 2 is not provided in the electromagnetic attracting type actuator 5, it is possible to reduce the number of constituent parts and hence to reduce cost.

Embodiment 6

Figure 7A:
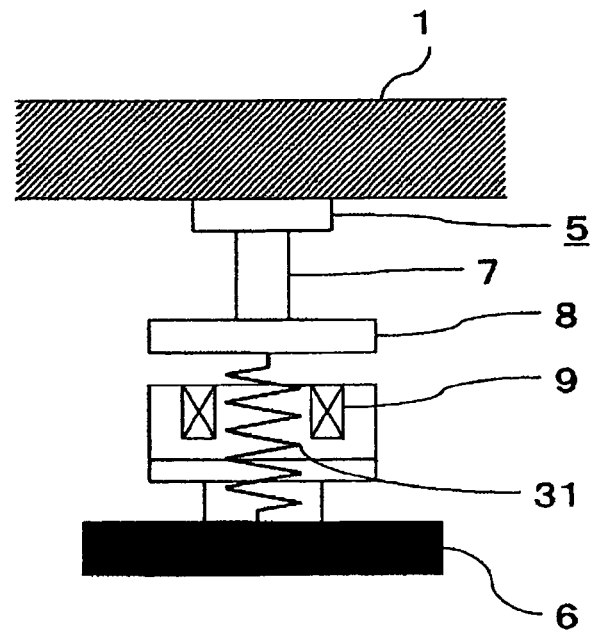
FIG. 7 is a structure diagram of an electromagnetic attracting type actuator used in a mirror support mechanism in accordance with embodiment 6 of the present invention.
Figure 7B:
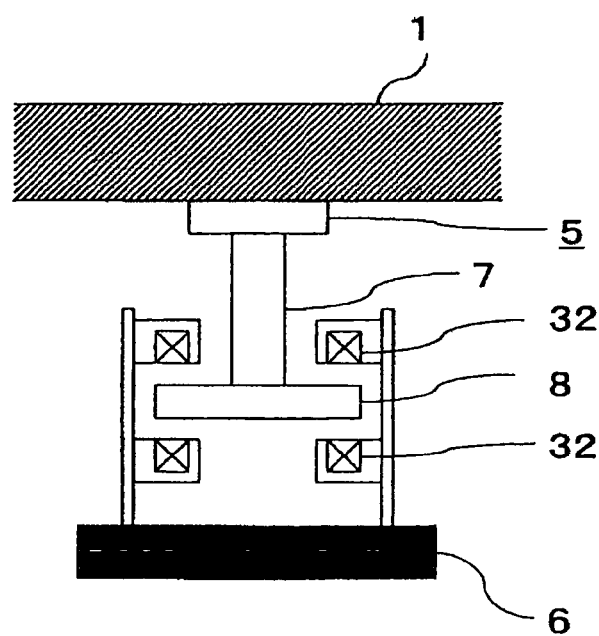

While the fluid pressure support mechanism 2 is provided in the electromagnetic attracting type actuator 5 described in embodiment 1 to embodiment 4, and embodiment 5 employs a structure in which the fluid pressure support mechanism 2 is not provided in the electromagnetic attracting type actuator 5. In embodiment 6 are described a case where a pressurization is applied in the electromagnetic attracting type actuator 5 to move up and down the driven member 8 and a case where an electromagnet is mounted in the vertical direction of the driven member to move up and down the driven member 8. FIG. 7 is a structure diagram of an electromagnetic attracting type actuator used in a mirror support mechanism in accordance with embodiment 6 of the present invention. The electromagnetic attracting type actuator 5 shown in this FIG. 7 can be provided in place of the electromagnetic attracting type actuator 5 shown in FIG. 1 to FIG. 6.

FIG. 7(*a*) shows a case where a pressurization is applied in the electromagnetic attracting type actuator 5. In FIG. 7(*a*), a reference numeral 31 denotes an elastic member for applying a pressurization to the rod 7 or the driven member 8 and, for example, an elastic material such as rubber or spring can be used as the elastic member. A current is passed through the electromagnet 9 so as to be against the pressurization thereby to set the reference position in the axial direction of the electromagnetic attracting type actuator 5. In a case where the electromagnetic attracting type actuator 5 shown in FIG. 1 to FIG. 6 is replaced with the electromagnetic attracting type actuator 5 shown in this FIG. 7(*a*), the mirror 1 or the segment mirror 18 is basically in a state where it is supported by the fluid pressure support mechanism 2 and when the mirror 1 or the segment mirror 18 is deformed from this state by its inclination or disturbance; the amount of current passed through the electromagnet 9 is controlled to increase or to decrease for moving up or down the rod 7 of electromagnetic attracting type actuator 5 in order to set the mirror 1 or the segment mirror 18 at a desired position. By this structure, the structure of the mirror support mechanism can be simplified and hence it can reduce the number of constituent parts thereof.

FIG. 7(*b*) shows the electromagnetic attracting type actuator 5 in which the electromagnets 9 are provided above and below the driven member 8. In FIG. 7(*b*), a reference numeral 32 denotes a pair of electromagnets which are provided above and below the driven member 8 and opposed to the driven member 8. In a case where the electromagnetic attracting type actuator 5 shown in FIG. 1 to FIG. 6 is replaced with the electromagnetic attracting type actuator 5 shown in this FIG. 7(*b*), the mirror 1 or the segment mirror 18 is basically in a state where it is supported by the fluid pressure support mechanism 2, and when the mirror 1 or the segment mirror 18 is deformed from this state by its inclination or disturbance, a control of passing a current through the upper and lower electromagnets 9 is performed as appropriate to move up or down the rod 7 of the electromagnetic attracting type actuator 5 to set the mirror 1 or the segment mirror 18 at the desired position. With this structure, the electromagnetic attracting type actuator 5 needs to be supplied with current only when the mirror 1 or the segment mirror 18 is deformed and it does not need to be always supplied with the current, so the amount of heat generated in the electromagnetic attracting type actuator 5 can be reduced.

What is claimed is:

1. A mirror support mechanism comprising:
   a mirror cell provided at the back of a mirror;
   a plurality of fluid pressure support mechanisms provided between the mirror cell and the mirror and applying support pressure to the mirror by respective containers having their volume changed by fluid pressure;
   an electromagnetic attracting type actuator including
   a rod connected to the mirror,
   a driven member mounted on the rod and driven by electromagnetic force,
   an electromagnet provided opposite to the driven member, and
   a container provided between the rod and the mirror cell and having its volume changed by the fluid pressure;
   a fluid pressure control unit that controls the fluid pressure applied to the respective containers in the plurality of fluid pressure support mechanisms and the fluid pressure applied to the container in the electromagnetic attracting type actuator; and
   fluid tubes connected to the respective containers in the fluid pressure support mechanisms and to the fluid pressure control unit in such a way as to make the containers communicate with each other.

2. An optical apparatus comprising:
   a plurality of segment mirrors;
   a mirror cell provided at the backs of the plurality of segment mirrors;
   fluid pressure support mechanisms each of which is provided between the mirror cell and at least one of the segment mirrors and applies support pressure to the at least one of the segment mirrors by respective containers having their volume changed by fluid pressure;
   an electromagnetic attracting type actuator including
   a rod connected to at least one of the segment mirrors,
   a driven member mounted on the rod and driven by electromagnetic force,
   an electromagnet provided opposite to the driven member, and
   a container provided between the rod and the mirror cell and having its volume changed by the fluid pressure; and
   a fluid pressure control unit that controls the fluid pressure applied to the containers in the fluid pressure support mechanisms and the fluid pressure applied to the container in the electromagnetic attracting type actuator; and
   fluid tubes connected to the respective containers in the fluid pressure support mechanisms and to the fluid pressure control unit in such a way as to make the containers communicate with each other.

3. The optical apparatus as claimed in claim 2, further comprising a weight and a fluid pressure support mechanism that is provided between the weight and the mirror cell and applies support pressure to the weight by a container having its volume changed by the fluid pressure, wherein a position of the weight is measured and the fluid pressure is controlled by the fluid pressure control unit.

4. A mirror support mechanism comprising:
a mirror cell provided at the back of a mirror;
a plurality of fluid pressure support mechanisms that are provided between the mirror cell and the mirror and applies support pressure to the mirror by respective containers having their volume changed by fluid pressure;
an electromagnetic attracting type actuator including
a rod connected to the mirror,
a driven member mounted on the rod and driven by electromagnetic force, and
an electromagnet provided opposite to the driven member;
fluid pressure control unit that controls the fluid pressure applied to the respective containers in the plurality of fluid pressure support mechanisms; and
fluid tubes connected to the respective containers in the fluid pressure support mechanisms and to the fluid pressure control unit in such a way as to make the containers communicate with each other.

5. The mirror support mechanism as claimed in claim 4, wherein the electromagnetic attracting type actuator has an elastic member for applying pressurization to the rod.

6. The mirror support mechanism as claimed in claim 4, wherein the electromagnetic attracting type actuator has a pair of electromagnets which are provided above and below the driven member and opposed to the driven member.

* * * * *